Dec. 18, 1923.  
R. E. McGAHEY  
1,478,287  
AUTOMOBILE HORN BUTTON EXTENSION  
Filed Jan. 6, 1923

Inventor  
Robert E. McGahey  
By L. F. Morrill  
Attorney

Patented Dec. 18, 1923.

1,478,287

UNITED STATES PATENT OFFICE.

ROBERT E. McGAHEY, OF ALEXANDRIA, VIRGINIA.

AUTOMOBILE HORN-BUTTON EXTENSION.

Application filed January 6, 1923. Serial No. 611,052.

*To all whom it may concern:*

Be it known that I, ROBERT E. MCGAHEY, a citizen of the United States, residing at Alexandria, in the county of Alexandria and State of Virginia, have invented certain new and useful Improvements in Automobile Horn-Button Extensions, of which the following is a specification.

This invention relates to extensions for automobile horn buttons and has for an object to provide an arm extending in a general radial direction from a button located centrally of the steering wheel, the arm terminating at a point adjacent the periphery of the wheel in position to be conveniently engaged by the thumb of the operator without removing his hand from the steering wheel.

A further object of the invention is to provide a device of the kind adaptable to horn buttons of various types as found upon various makes and models of automotive vehicles.

A further object of the invention is to provide in combination with such extension of means for holding articles ordinarily used by the driver, as for instance a cigar, a card or the like.

With these and other objects in view, the invention comprises certain novel parts, elements, combinations, construction and arrangements as shown in the drawings together with mechanical equivalents thereof, as will be hereinafter more fully described and claimed.

In the drawings.

Like characters of reference indicate corresponding parts throughout the several views.

Figure 1:
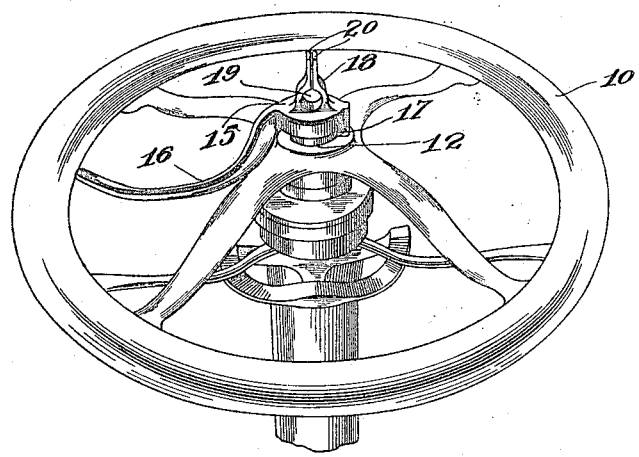
Figure 1 is a perspective view of a conventional steering wheel and horn button located centrally thereof with the present invention applied thereto in operative position.
Figure 2:
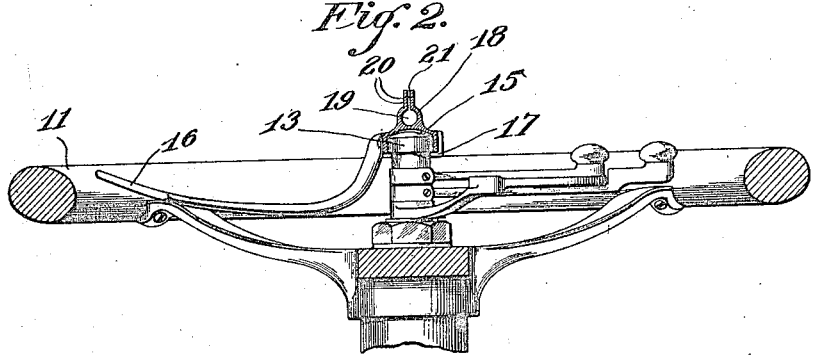
Figure 2 is a diametrical sectional view of a different type of steering wheel and associated parts with the extension applied to the centrally located push button, such extension being shown partly in section.
Figure 3:
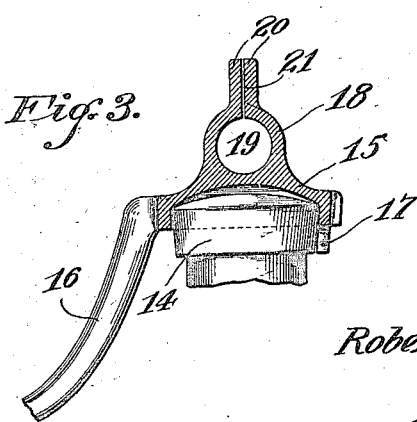
Figure 3 is a view partly in section of a fragment of the extension applied to still a different type of horn button.

It is well known that in the present preferred type of automotive vehicle construction, a steering wheel is provided, shown at 10 in Figure 1, with a slightly different type shown at 11 at Figure 2. In either type a push button is provided centrally of the steering wheel by the depression of which electrical circuit is supplied for sounding the alarm horn or other alarm mechanism. This push button is variously shown at Figure 1 as 12, at Figure 2 as 13, and at Figure 3 as 14, representing merely so many of the various types of push buttons now commonly in use.

The present invention is intended to be applied to push buttons of this general type and comprises a cup member 15, proportioned to pass over and embrace the button. From this cup member an arm 16 extends toward the periphery of the wheel and is bent, curved or otherwise proportioned and contoured as the particular make and size of the wheel may make necessary or desirable to bring the extremity of the arm adjacent to the rim of the wheel so that the operator may conveniently place his thumb on the arm without removing his hand from the wheel and thus produce the desired alarm effect without detracting from his steering ability. It is to be understood that the curvatures and relative lengths of the arm 16, as shown at Figures 1 and 2, are only illustrative and are in no way limiting upon the present invention.

The cup 15 is secured upon the button in any approved manner, but preferably by forming a bendable tongue 17 upon the side diametrically opposite the arm 16. If the type of push button is such as to be wholly embraced within the cup, this bendable tongue 17 may be bent under the edge of the button. If the button is deeper than the cup, it may bear frictionally and with a certain amount of spring action against the side of the button. No great stress will be placed upon this device as the button is easily depressed whereby the connecting means may be of the simplest type.

While in the drawings, especially at Figure 1, the arm 16 is shown extending substantially on a line perpendicular to the line of travel of the car, it is to be understood that its connection with the button as just described is such that it may be rotated through any part of a revolution and may even be turned to be operated by the other hand should the convenience or inclination of the operator make this desirable.

Upon the top of the cup 15 a structure is provided comprising a band 18, defining an opening 19 proportioned and positioned to receive and hold a cigar, cigarette or other like article. Above the band 18, lips 20 are provided, preferably produced by means of a saw cut 21, producing spring fingers for the holding of a card or the like grasped between such tongues.

With the device mounted upon the horn button in the manner indicated at Figures 1 and 2, but not limited by such specific mounting or association, it will be obvious that the arm will extend to such a position adjacent the rim of the wheel and may be rotated as found desirable to bring the extremity in position to be operated by the thumb of the user in the position in which the user normally holds his hand upon the wheel while driving and while the invention is in no way limited to the manner of use the advantages thus accruing will be apparent.

What I claim to be new is:

1. A horn button extension comprising a cup proportioned to embrace and cover a horn button, means to secure the cup to the button, and an arm extending from the cup.

2. A horn button extension comprising a cup proportioned to embrace and cover a horn button, a bendable finger carried by the cup adapted to be bent into retaining engagement with the horn button, and an arm extending from the cup.

3. A horn button extension comprising a cup proportioned to embrace and cover a horn button, a bendable finger carried by the cup adapted to be bent into retaining engagement with the horn button, and an arm extending from the cup in a direction diametrically opposite the bendable tongue.

In testimony whereof I affix my signature.

ROBERT E. McGAHEY.